May 19, 1970 J. L. GRATZMULLER 3,513,341

PERMANENT MAGNET ROTOR FOR AN ELECTRIC MACHINE

Filed March 31, 1967

PERMANENT MAGNET ROTOR FOR AN ELECTRIC MACHINE
Filed March 31, 1967 2 Sheets-Sheet 2
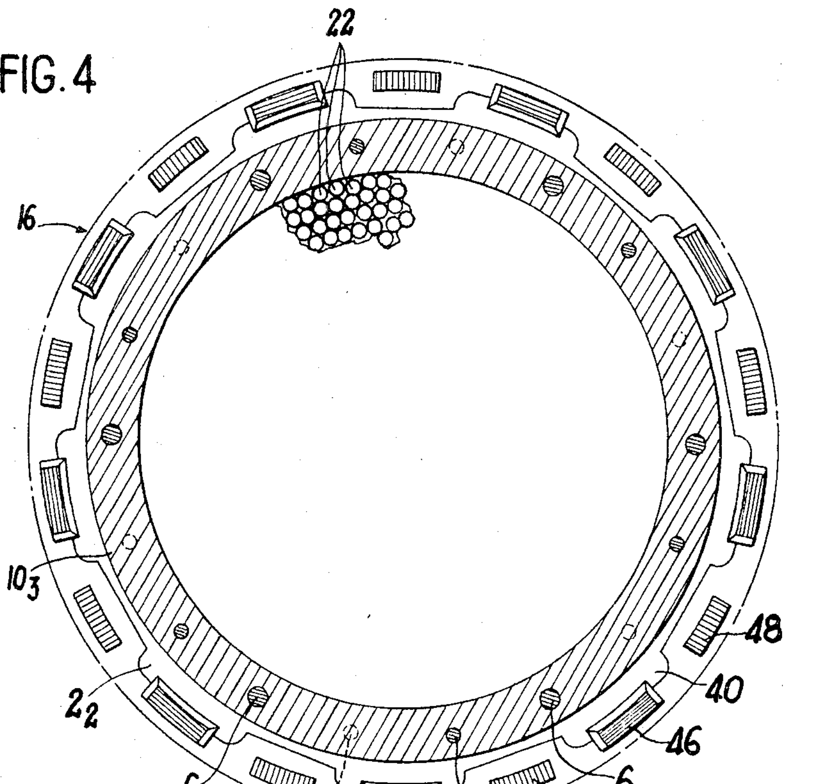
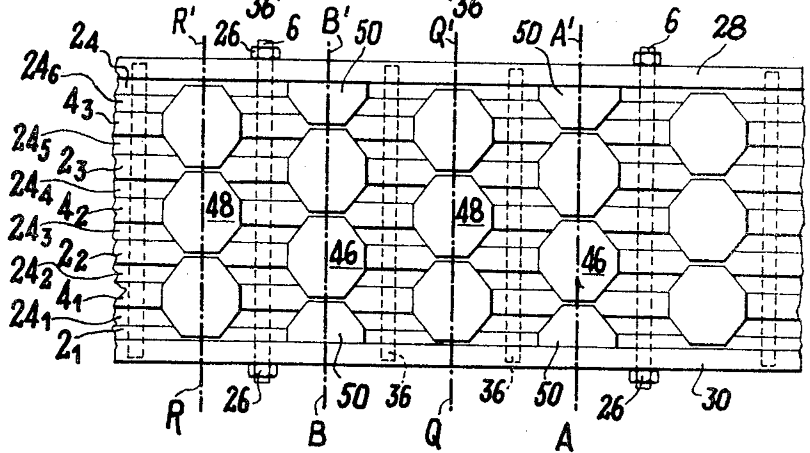
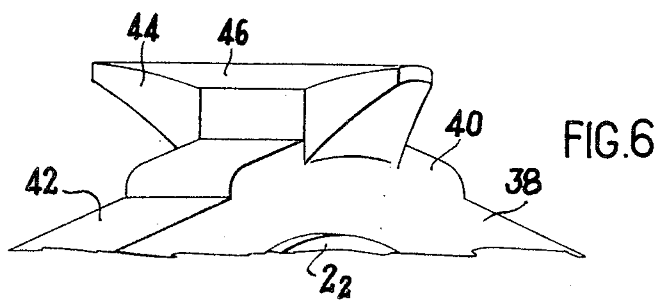

3,513,341
PERMANENT MAGNET ROTOR FOR AN ELECTRIC MACHINE

Jean Louis Gratzmuller, 66 Blvd. Maurice Barres, Neuilly-sur-Seine, Hauts-de-Seine, France Filed Mar. 31, 1967, Ser. No. 627,365
Claims priority, application France, Apr. 4, 1966, 56,228
Int. Cl. H02k 21/12
U.S. Cl. 310—156 4 Claims

ABSTRACT OF THE DISCLOSURE

A permanent magnet rotor is provided in which at least two axially spaced pole plates with peripheral pole pieces are secured together with an interposed coaxial spacer ring of non-magnetic material to form an enclosed cylindrical chamber which is filled by a plurality of permanent bar magnets in side-by-side relation extending lengthwise between the pole plates and oriented such that their north poles contact one plate and their south poles contact the other plate. A housing of non-magnetic material is secured to the outer face of one plate for connection with a rotary shaft.

The present invention relates to a rotor for an electric machine which may be a generator or motor.

Electric machines have been proposed in which excitation is produced by a rotor with a permanent magnet but such rotors are applicable only to low powered machines, of the order of several hundreds of watts (magnetos, toy motors, tachometers, small alternators, selsyns, etc.), in view of the characteristics of the permanent magnets used in such rotors.

In the case where the electric machine has a permanent magnet field, it is particularly advantageous that this field be the rotor, which eliminates any problem of brushes and slip rings or commutators. However, the mechanical strength of the most promising magnets from the magnetic point of view is insufficient for resisting the stresses to which large diameter rotors are submitted when turning at high speed. In fact, if, on one hand, the magnets for example, of steel with cobalt, have good mechanical qualities and a good magnetic permeability, their coercive field is relatively weak. On the other hand, grained or ferrite magnets have a very high coercive field which ensures perfect conservation of the magnetization in spite of reverse fields, but their permeability is low and they are extremely fragile, which makes it impossible to operate them under tensile stress. In addition, machining of these magnets is practically impossible at an economic rate.

The present invention, due to a particular arrangement of the pole elements and a new mounting of the magnets, allows one to produce permanent magnet rotors for machines of any power and this in spite of the unfavorable mechanical characteristics of present permanent magnets.

The present invention is directed to a permanent magnet rotor for an electric driving or generating machine, comprising at least two coaxial plates of magnetic material centered on the axis of rotation of the rotor, these plates being mutually secured by non-magnetic spacer means which leaves between adjacent plates a space in which is housed at least one permanent magnet having its axis parallel to the axis of rotation of the rotor and whose north and south polar faces bear respectively on the opposing surfaces of the adjacent plates so that the said plates present alternately north and south polarities, each of the said plates being provided with at least one pole shoe at its periphery which projects radially in relation to the periphery of the plates, these shoes being angularly distributed in regular fashion and alternately in polarity, the pole faces of the said rotor being thus made up of the said shoes.

The above plates can be fixed in parallel spaced relation to each other by non-magnetic fixing and spacing means which define between the plates a space forming a closed compartment in which the magnets are housed and fixed.

According to a preferred form of embodiment, the rotor is made up of a stack of plates of alternately north and south polarity when magnetized, between each of which is fitted a "bed" of permanent magnets whose poles are all aligned in the same direction.

The magnets, since they are not incorporated in a mechanical mounting but are held together between the plates by the pressure of one against the other, allows selection of magnets of simple shape, for example cylindrical bars of short length in circular section or polygonal section e.g. hexagonal.

Since the magnets are not submitted any stress other than small compression stresses, it is possible to use grained magnets, such as the ferrites, which have poor resistance to tensile stresses but a very high coercive field which allows them to resist demagnetization in reverse fields. Another advantage is that, for a relatively high field, their length is comparatively small, which permits a large pole area in relation to the length of the rotor. In addition, since the magnets are short the space occupied by the rotor can be reduced. In rotors according to the invention when fitted with ferrites, not only is there obtained the advantage of the high coercive field (i.e. no effect from reverse fields in the case of a short circuit) but also the advantage that the limited magnetic permeability of these materials limits the intensity of short circuit currents and thus protects the machine, for example an alternator, against accidents in use.

Several embodiments of the present invention will now be described by way of example, with reference to the accompanying drawings in which:

FIGURE 4 is a section view of the rotor of FIG. 3, on line IV—IV of FIG. 3.

FIG. 5 is a partial external view developed from the rotor shown in FIG. 3.

FIG. 6 is a perspective view of one of the pole shoes of the rotor shown in FIG. 3.

Figure 2:
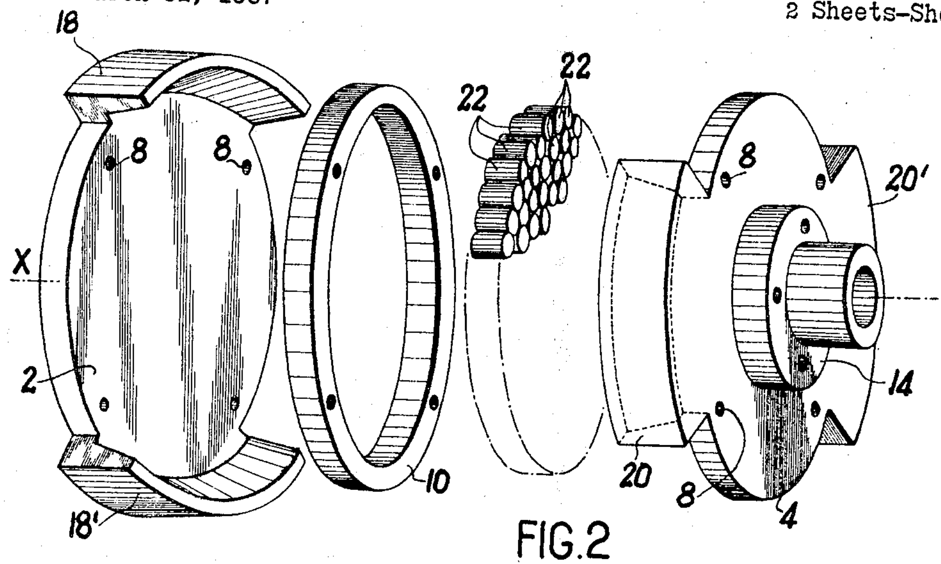
FIG. 2 is an exploded perspective view of the rotor shown in FIG. 1.
Figure 1:
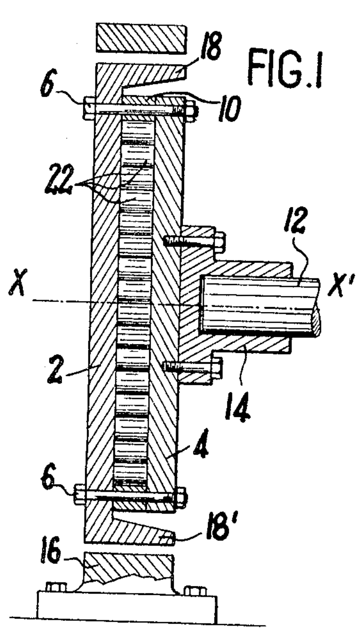
FIG. 1 is a sectional view, on a diametric plane, of a rotor according to a simple embodiment of the invention.

In the simple exemplified embodiment of the invention shown in FIGS. 1 and 2 there is shown a rotor which comprises a first circular plate 2 of a magnetic material such as mild steel, and a second circular plate 4. These two plates, 2 and 4, are fixed to each other in parallel alignment by non-magnetic means such as bronze bolts or stainless steel bolts 6 passing through holes 8 machined in the plates 2 and 4. A spacer ring 10 of non-magnetic material such as bronze, maintains a fixed distance between the opposing faces of plates 2 and 4. The space thus formed constitutes a chamber in the shape of a cylindrical disc in which are housed, as will be seen later, the permanent magnets.

At least one of the plates, for example plate 4, is integral with a machine shaft 12, by means of a disc 14 for example, preferably of non-magnetic metal, secured on the outer face of the plate 4. Shaft 12 can be a driving shaft, should the machine equipped with the rotor be a motor (whose fixed armature is shown by reference 16) or a driven shaft in the case where the machine is a generator such as a dynamo or an alternator.

Each of the plates carries at its periphery a certain number of pole shoes 18—18′ and 20—20′ which are regularly distributed angularly and aligned on the external peripheral surface of the rotor when the plates are assembled. In FIGS. 1 and 2 there is shown a four pole rotor.

A number of individual permanent magnets 22, each of the same length, are housed side by side in the abovementioned disc shaped chamber. All the magnets 22 have their axes parallel to the axis of rotation XX′ of the rotor and all their north polar faces bear against the internal face of one of the plates while all their south polar faces bear against the opposing face of the other plate. Due to this parallel placing of the magnets one of the plates, for example plate 2, assumes north polarity while the other plate 4 assumes south polarity. Once the rotor is assembled it presents successively on its periphery: one north pole 18, one south pole 20′, one north pole 18′, one south pole 20, which turn in front of windings (not shown) on the fixed armature 16.

One chooses by preference identical magnets in the shape of cylindrical bars whose length is small in relation to the section (the diameter can for example be the same as the length), this length being identical to the thickness of the spacer ring 10.

In a driving or generating machine, the rotor is subjected to significant demagnetizing influences so it is advantageous to use magnets made of a material of very high coercive field (for example in excess of 1000 oersteds) such as those known under the name of sintered Alnico, grained magnets, and particularly the ferrites. One may thus avoid the demagnetizing reverse fields, and the length of the bars can be much less than with the usual materials, which reduces the space occupied by the rotor, especially when this is made up of a large number of plates as will be seen from FIGS. 3 to 6.

The above materials normally give rise to mechanical problems since they are hard, fragile and practically impossible to machine except by grinding. The rotor assembly in accordance with the invention obviates these problems because sintered magnets can be obtained in quantity with good tolerances (for example .02 mm.) and they are applied to the flat surfaces of the plates which can be machined with great precision.

The magnets, once they are housed between the plates, are not submitted to any tensile or shearing stresses, to which they have very low resistance, but only to compression stresses which they can resist if their dimensional tolerances are such that they are pressed between the plates.

The ferrites have a relatively small magnetic permeability but in a rotor according to the invention there is available a support surface for the pole faces of the magnets (while surface may be 80% of the surface of the plates) considerably greater, for example 10 times greater, than the surface of the corresponding pole shoes 18—18′.

In the small interstices between the cylindrical surfaces of the magnetized bars, there can be housed other small bars of minimal diameter but the gain would be small and it may be preferable to use bars having, for example, a hexagonal section. To fill in the interstices between the bars when they are cylindrical, a filler material can be used, such as an adhesive or a powder. In the case where the manufacturing tolerances would make the bars slightly shorter than the thickness of the spacer ring 10, one can, before placing the magnets on the plates, coat the surface of the plates with a thin layer of adhesive such as is sold under the registered trade mark of Araldite to fix the magnets and the plates properly.

In the case where the rotor is for a low power machine, the "bed," as shown in FIG. 2 made up of a large number of elementary magnets 22, can be replaced by a few magnets only, for example seven magnets of hexagonal section, arranged side by side. In the extreme case, and for reduced powers there can be interposed between the two plates, a single magnet in the form of a disc.

If shaft 12 of the machine were fitted across plates 2 and 4, a portion of the space available for housing the magnets would be lost and relatively large air gaps must be provided to avoid magnetic leaks through the shaft.

FIGS. 3 to 6 show a rotor according to the invention, which can be employed in an alternator or a high power motor.

The rotor comprises a large number of circular plates $2_1$, $4_1$, $2_2$, $4_2$, $2_3$, $4_3$, $2_4$, which are grouped in a stack allowing, between each pair of consecutive plates, a space in the shape of a circular disc in the interior of each of which is lodged a "bed" of magnets.

The rotor has seven plates and there therefore exists between the plates six spaces $24_1$, $24_2$ . . . $24_5$, $24_6$, where the magnets are arranged as shown in FIGS. 1 and 2 i.e. with their axes parallel to the axis X of the rotor. The two opposing faces of a plate are in contact with the equivalent poles of the magnets, which means that successive plates have north and south polarities.

Thus, plate $4_1$ is in contact on its two opposite faces with the south poles of the magnets 22 of the two "beds of magnets" $24_1$ and $24_2$ so that this plate assumes south polarity.

It is of advantage, as shown, to provide an odd number of plates so that the rotor presents two end plates of the same polarity, thus diminishing the risk of magnetic leaks because the end plates $2_1$ and $2_4$ can be less thick being magnetized on only one of their faces.

The inductor shown therefore has four north pole plates ($2_1$, $2_2$, $2_3$, $2_4$) and three south pole plates ($4_1$, $4_2$, $4_3$).

The distance between the plates is maintained by nonmagnetic spacer means such as spacer rings $10_1$ to $10_6$, made of bronze, the rotor assembly being clamped by tie bars 6 with nuts 26 thereon which engage non-magnetic metal flanges of end plates 28 and 30, the first of which is coupled to shaft 12, which may be driving or driven, of the machine, while the second has a stub axle 32 journalled in a bearing 34.

Figure 3:
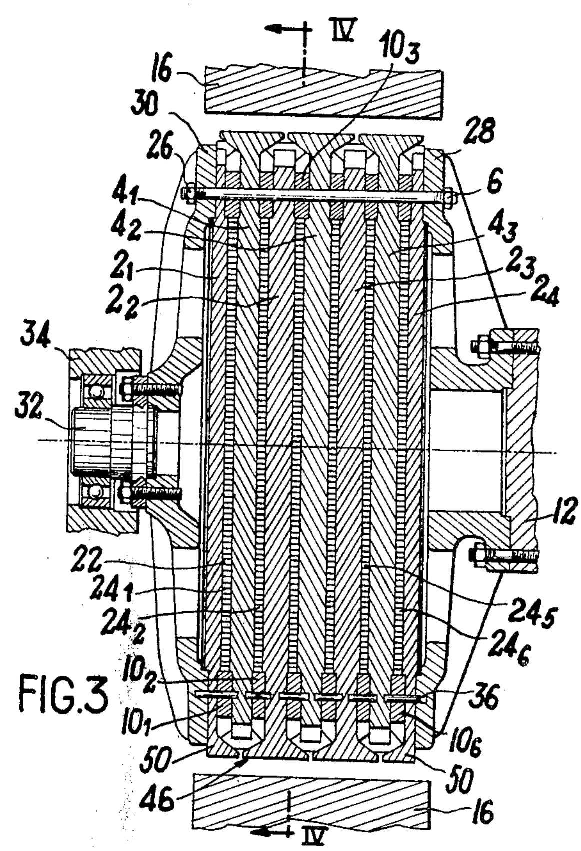
FIG. 3 is a diametric section of a rotor with 18 poles according to the invention, suitable for a powerful electrical machine, such as an alternator.

Between the tie rods 6 can be fitted positioning pins 36 with no clamping devices (FIGS. 3, 4 and 5).

To reduce the possibility of magnetic leaks, the spacer rings $10_1$ to $10_6$, as is shown in FIG. 3, can have a thickness greater than that of the spaces $24_1$ to $24_6$, wherein the magnets are housed, to increase the distance between the peripheral parts of the plates carrying the flux. To achieve this, the peripheral parts 38 of the plates are reduced in thickness as shown sectionally in FIG. 3 and in perspective in FIG. 6 for plate $2_2$.

The invention also permits production of a rotor having a small number of poles (e.g. four as in the embodiment shown in FIGS. 1 and 2) as well as a rotor with a large number of poles (e.g. 18 as in the example in FIGS. 3 to 6).

Each plate, for example the north plate $2_2$ in FIG. 6, is fitted with pole shoes arranged at angles, for example at 40°, in the example chosen.

These shoes include a part 40 which projects radially in relation to the periphery 42 of the plate and a part 44 which projects radially and axially in relation to the plate, the cylindrical surface 46 of the shoe forming the actual pole face.

In the developed view of FIG. 5 it can be seen that the pole shoes 46 of the north plates $2_1$, $2_2$, $2_3$, $2_4$, are aligned with pole axes AA′, BB′ on the cylindrical external surface of the rotor, while the pole shoes 48 of the south plates $4_1$, $4_2$, $4_3$ are aligned with pole axes QQ′, RR′ equidistant from the preceding axes. In certain embodiments these pole axes can be slightly skewed, for example along a helicoidal line as is normal for certain forms of machines.

As shown in FIG. 5, the pole shoes may have a polygonal cross section, for example octagonal.

The rotor shown in FIGS. 3 to 6 operates in conjunction with a fixed armature 16 of conventional construction to constitute a rotary machine, such as an alternator or the like without slip rings.

As in the preceding embodiment, and for the same reasons, permanent magnets of ferrite with a high coercive field are preferably employed.

I claim:

1. A permanent magnet rotor comprising at least two axially spaced pole plates having peripheral pole pieces, the diameter of said pole plates being greater than the axial spacing between adjacent pole plates, a spacer ring of non-magnetic material loosely interposed between said pole plates in coaxial relation therewith and forming with said pole plates a cylindrical chamber, assembling means including a plurality of tie rods of non-magnetic material extending through said pole plates and said spacer ring in circumferentially spaced relation to hold said pole plates and said spacer ring together, a structural element of non-magnetic material secured to the outer face of one of said pole plates and adapted to constitute a drive connection between said rotor and an outside rotary shaft coupled with said structural element, and a permanent magnet body filling said chamber and consisting of a plurality of bar magnets disposed in side-by-side relation and extending lengthwise between said pole plates, said bar magnets having the same orientation with their north poles in contact with one plate and their south poles in contact with the other plate.

2. A permanent magnet rotor according to claim 1, i which said permanent bar magnets are formed of a ferrit material.

3. A permanent magnet rotor according to claim 1, i which said permanent bar magnets are of hexagonal cros section.

4. A permanent magnet rotor according to claim 1 wherein an odd number of axially spaced pole plates ar provided, the outermost of which have the same polarit

References Cited

UNITED STATES PATENTS

| | | | |
|---|---|---|---|
| 2,651,733 | 9/1953 | Stark | 310—263 |
| 3,181,018 | 4/1965 | Shafranek | 310—262 |
| 3,303,369 | 2/1967 | Erickson | 310—263 |
| 3,218,494 | 11/1965 | Bacon et al. | 310—15 |
| 3,206,623 | 9/1965 | Snowdon | 310—156 |
| 3,119,941 | 1/1964 | Guiot | 310—156 |
| 2,836,743 | 5/1958 | Braun | 310—15 |
| 2,802,959 | 8/1957 | Powers | 310—263 |
| 2,704,231 | 3/1955 | Goldsmith | 308—1 |
| 2,334,157 | 11/1943 | Morath | 310—263 |
| 2,315,408 | 3/1943 | Faus | 308—1 |
| 2,212,192 | 8/1940 | Howell | 310—263 |

MILTON O. HIRSHFIELD, Primary Examiner

M. O. BUDD, Assistant Examiner

U.S. Cl. X.R.

310—262, 263